United States Patent
Fulford

(10) Patent No.: US 10,450,841 B2
(45) Date of Patent: Oct. 22, 2019

(54) METHODS FOR STATISTICAL PREDICTION OF WELL PRODUCTION AND RESERVES

(71) Applicant: APACHE CORPORATION, Houston, TX (US)

(72) Inventor: David Fulford, The Woodlands, TX (US)

(73) Assignee: APACHE CORPORATION, Houston, TX (US)

( * ) Notice: Subject to any disclaimer, the term of this patent is extended or adjusted under 35 U.S.C. 154(b) by 150 days.

(21) Appl. No.: 15/311,501

(22) PCT Filed: Apr. 29, 2015

(86) PCT No.: PCT/US2015/028142
§ 371 (c)(1),
(2) Date: Nov. 15, 2016

(87) PCT Pub. No.: WO2015/175216
PCT Pub. Date: Nov. 19, 2015

(65) Prior Publication Data
US 2017/0114617 A1    Apr. 27, 2017

Related U.S. Application Data

(60) Provisional application No. 61/994,147, filed on May 16, 2014.

(51) Int. Cl.
*E21B 41/00* (2006.01)
*G06G 7/57* (2006.01)
(Continued)

(52) U.S. Cl.
CPC .......... *E21B 41/0092* (2013.01); *E21B 43/00* (2013.01); *G06F 17/18* (2013.01); *G06G 7/57* (2013.01)

(58) Field of Classification Search
None
See application file for complete search history.

(56) References Cited

U.S. PATENT DOCUMENTS 8,972,232 B2 * 3/2015 Sarma .................... G01V 1/308
                                                703/9
9,058,445 B2 * 6/2015 Usadi .................. G06F 17/5009
(Continued)

OTHER PUBLICATIONS

International Search Report of PCT/US2015/028142, dated Aug. 7, 2015.
(Continued)

*Primary Examiner* — Omar F Fernandez Rivas
*Assistant Examiner* — Michael Edward Cocchi
(74) *Attorney, Agent, or Firm* — Richard A. Fagin

(57) ABSTRACT

A method for optimizing a well production forecast includes inputting into a computer: initial production rate measurements and probability distributions to estimate production forecast model parameters. The computer generates an initial forecast of fluid production rates and total produced fluid volumes using a selected production forecast model. After a selected time, the initial forecast is compared with actual production rate and total produced fluid volume measurements to generate an error measurement. Parameters of the selected production forecast model are adjusted to minimize the error measurement, thereby generating an adjusted production forecast model. The parameter adjustment and error measurement are repeated for a plurality of iterations to generate a plurality of production forecast models each having a determined likelihood of an error measurement. The plurality of production forecast models are displayed with respect to likelihood of error.

3 Claims, 9 Drawing Sheets

(51) Int. Cl.
*E21B 43/00* (2006.01)
*G06F 17/18* (2006.01)

(56) References Cited

U.S. PATENT DOCUMENTS

| | | | | |
|---|---|---|---|---|
| 2004/0084180 A1* | 5/2004 | Shah | ................ | E21B 47/10 |
| | | | | 166/250.16 |
| 2007/0168170 A1* | 7/2007 | Thomas | ................ | E21B 43/00 |
| | | | | 703/10 |
| 2007/0199721 A1* | 8/2007 | Givens | ................ | G06Q 10/06 |
| | | | | 166/382 |
| 2009/0043555 A1* | 2/2009 | Busby | ................ | E21B 43/00 |
| | | | | 703/10 |
| 2009/0125288 A1* | 5/2009 | Main | ................ | E21B 43/00 |
| | | | | 703/10 |
| 2009/0164188 A1* | 6/2009 | Habashy | ................ | E21B 43/00 |
| | | | | 703/10 |
| 2010/0300682 A1* | 12/2010 | Thakur | ................ | E21B 43/00 |
| | | | | 166/250.01 |
| 2011/0054869 A1* | 3/2011 | Li | ................ | G06F 17/5009 |
| | | | | 703/10 |
| 2012/0330553 A1* | 12/2012 | Mollaei | ................ | E21B 43/16 |
| | | | | 702/11 |
| 2013/0140031 A1* | 6/2013 | Cohen | ................ | E21B 43/26 |
| | | | | 166/308.1 |
| 2014/0297235 A1* | 10/2014 | Arora | ................ | E21B 43/00 |
| | | | | 703/2 |
| 2016/0004800 A1* | 1/2016 | Singh | ................ | G05B 13/04 |
| | | | | 703/10 |
| 2016/0356125 A1* | 12/2016 | Bello | ................ | G06Q 10/04 |

OTHER PUBLICATIONS

Written Opinion of the International Searching Authority of PCT/US2015/028412, dated Aug. 7, 2015.
Canadian Office Action dated Jul. 10, 2019 for Application No. 2,949,351.

* cited by examiner

METHODS FOR STATISTICAL PREDICTION OF WELL PRODUCTION AND RESERVES

BACKGROUND

This disclosure is related to the field of analysis of fluid production from subsurface wellbores to evaluate expected future fluid production and ultimate total fluid production therefrom. More specifically, the disclosure relates to methods for statistical analysis of time-dependent fluid production rate and cumulative produced fluid volume measurements to obtain improved estimates of future fluid production rate and ultimate cumulative production volumes.

Statistical prediction of well fluid production rates is known in the art for use in estimating wellbore reserves and wellbore economic value. Several methods known in the art are used to quantify the uncertainty in wellbore fluid production forecasts, which is useful for representing a range of reserves in accordance with United States Securities and Exchange Commission (SEC) reserves reporting rules, and estimating the chance of commercial success of oil and gas wells given the inherent uncertainty in forecasting.

Production forecasts are engineering interpretations of fluid production volumetric or mass rate data to predict the performance of hydrocarbon producing (oil and gas) wells. Data used for production forecasts may be obtained from disparate sources, but most often when a wellbore is already producing fluids (including oil and/or gas), the data used are typically solely measurements of production rates. The fluid production rate is often displayed on a Cartesian coordinate graph wherein the fluid production rate is shown on the y-axis, and the time of measurement shown on the x-axis. An example fluid production rate graph is shown in FIG. 1. Many different versions of the same basic data display also known in the art to be used, such as log-log and semi-log axis display of the same fluid production rate data (shown in FIG. 2 and FIG. 3), as well as other transforms of the fluid production rate data. These manipulations and transforms may identify different trends used to characterize the change in fluid production rate over time, and to evaluate the quality of the fit of a model to the fluid production rate measurement data. A model may be a representation of inferred physical characteristics of a particular subsurface reservoir, such as fluid pressure, fractional volumes of pore space occupied by oil, gas and water, viscosities and composition of the reservoir fluids, geometry of the reservoir, and the drive mechanism by which fluid is moved from the reservoir to the Earth's surface.

Interpretation of the fluid production rate measurement data to generate a fluid production rate and/or cumulative produced fluid volume forecast is usually performed by analysis of the interpreter in a process of "tuning" Estimates of the parameters used in the model used for forecasting may be obtained from interpretation or diagnosis of the fluid production rate measurement data, or, when the data displays no strong indications, from analogous data such as data from geodetically proximate ("offset") wells or subsurface reservoirs having similar characteristics. For example, a wellbore having a well-defined fluid production rate measurement trend is shown in FIG. 4, while a wellbore having fluid production rate measurement data that may be characterized as "noisy" is shown in FIG. 5.

Interpretation of fluid production rate measurement data using known techniques such as curve fitting to generate fluid production rate forecasts and/or cumulative fluid production volume forecasts typically does not include a calculation of error between the forecast and the measurement data. Such forecasts are typically performed by a human interpreter and are based at least in part on informed but subjective judgment of the human interpreter. There are limitations associated with forecasting based on such human interpretation including, for example, difficulties associated with consistently reproducing interpretations among different human interpreters, non-uniqueness of interpretations among interpreters, the inability to rapidly make interpretations using computer algorithms, the inability to quantify the uncertainty inherent in any prediction of future well production, and the requirement that the interpreter be highly skilled in the art of fluid production rate measurement data interpretation so as to make subjective judgments well informed.

DETAILED DESCRIPTION

Figure 1:
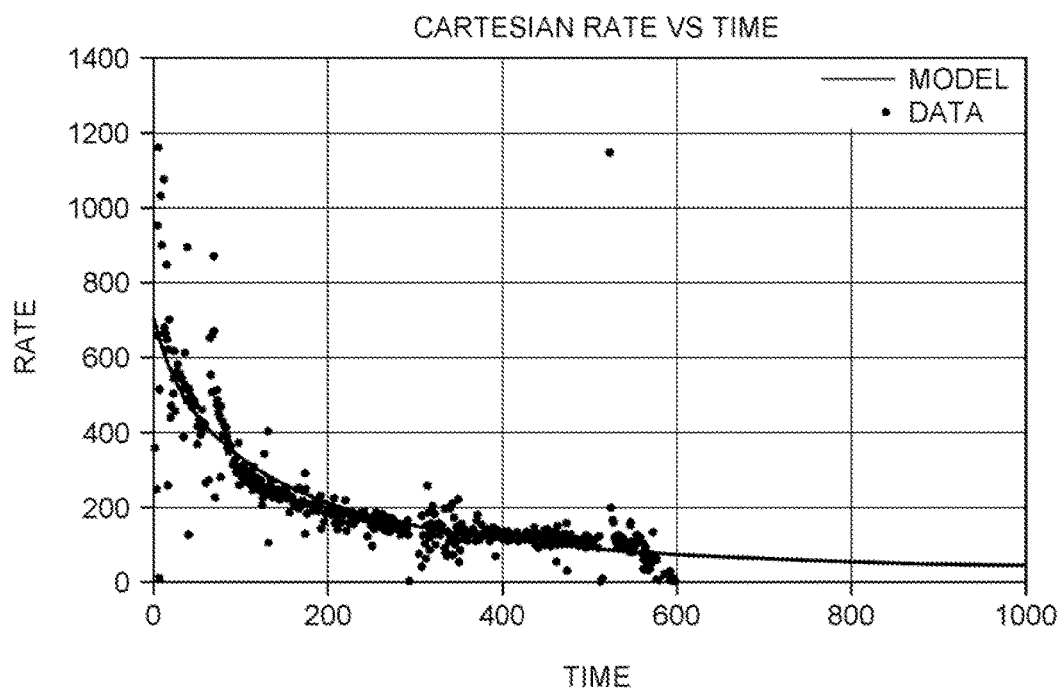
FIG. 1 shows a graph of production data with production rate on the y-axis, and the time of measurement on the x-axis in Cartesian coordinates.
Figure 2:
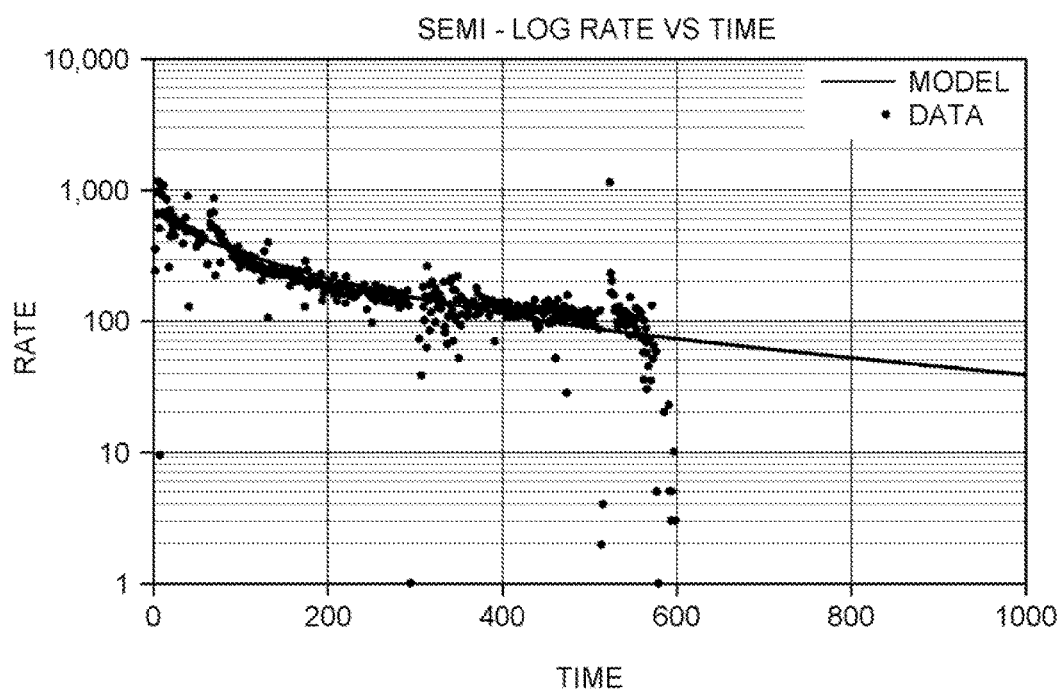
FIG. 2 shows a graph such as in FIG. 1 with a logarithmic scale on the y-axis.
Figure 3:
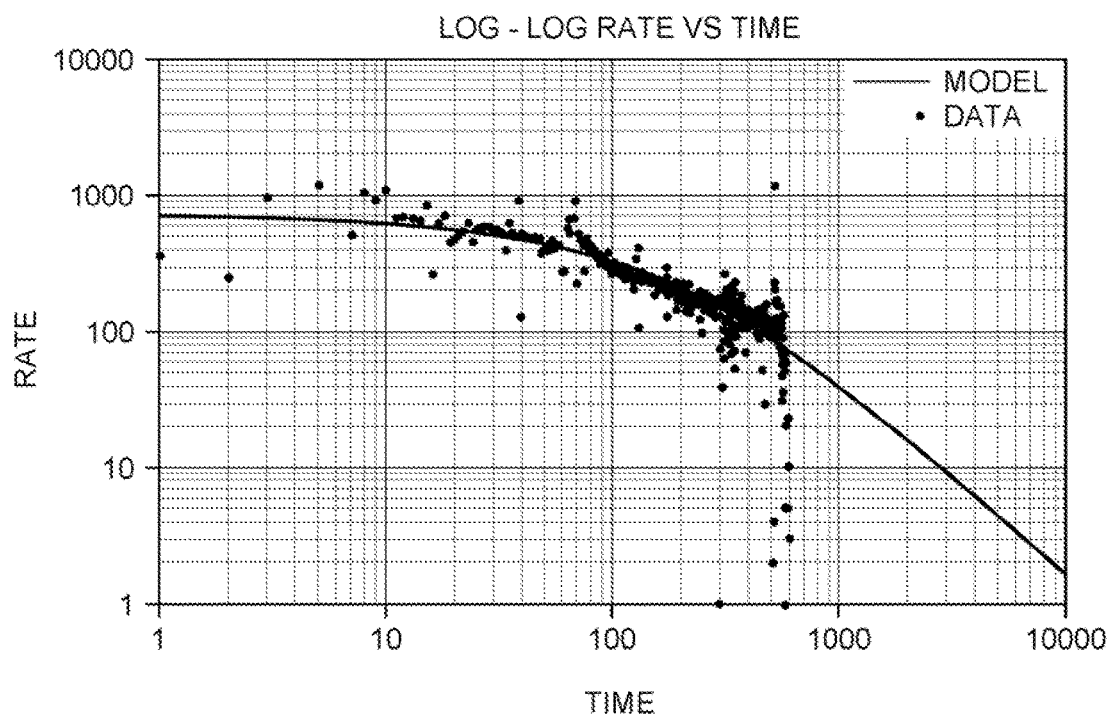
FIG. 3 shows a graph such as in FIG. 1 with a logarithmic scale on both axes.
Figure 4:
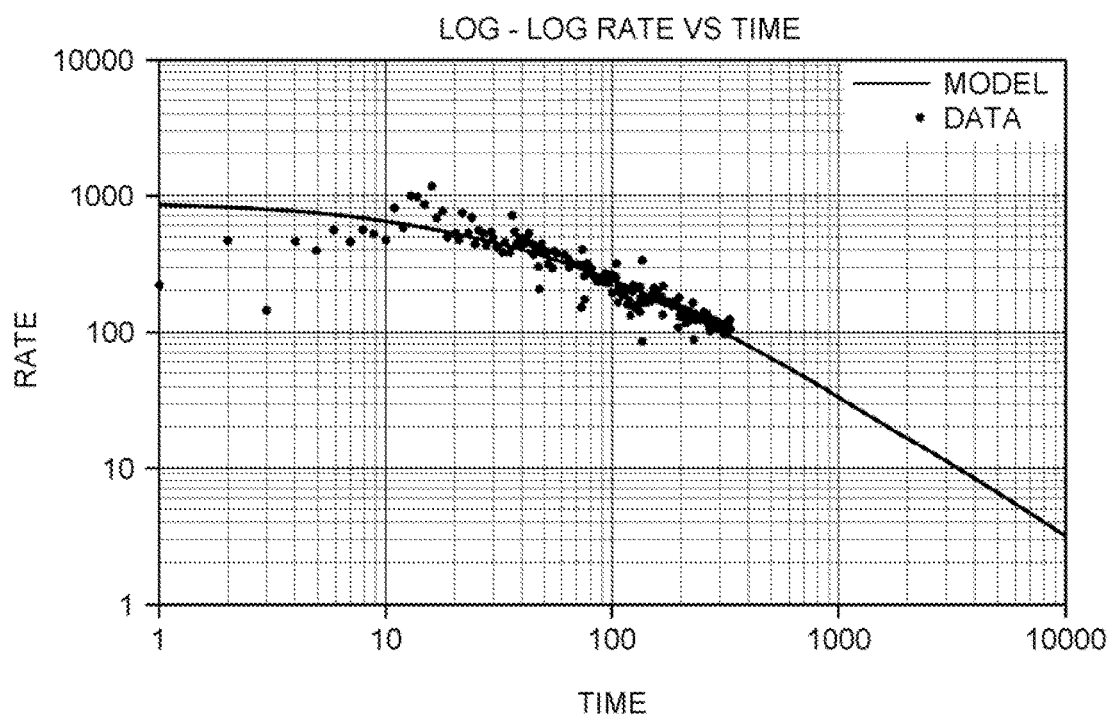
FIG. 4 shows a graph such as FIG. 1 for an example well having a well-defined production decline trend with respect to time.
Figure 5:
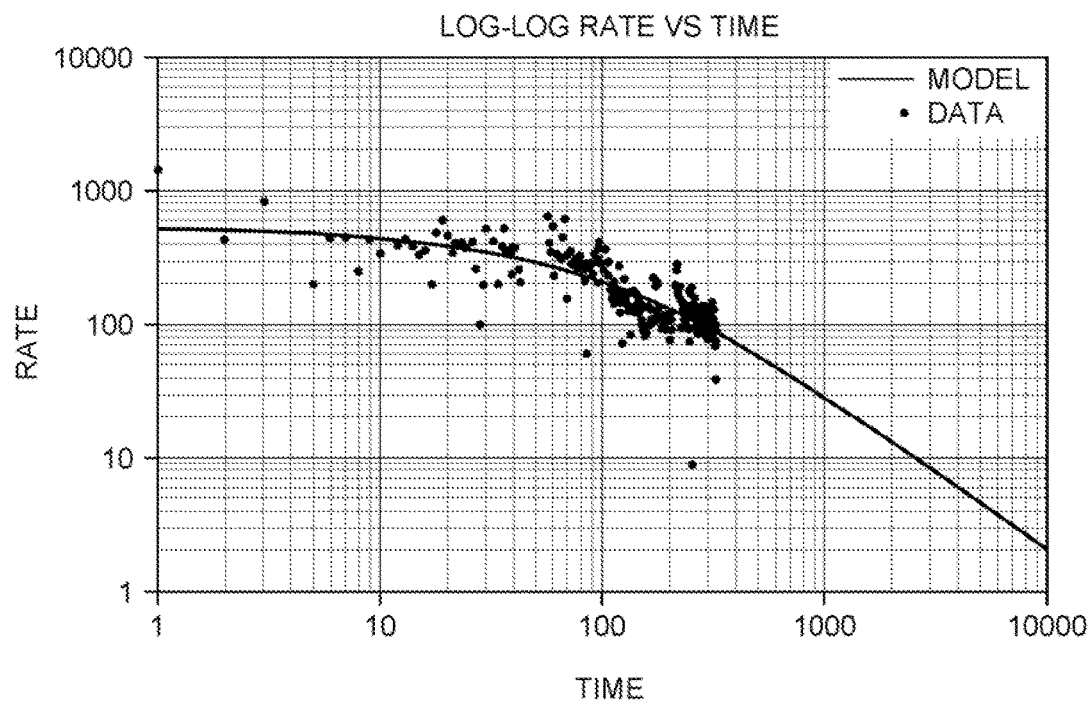
FIG. 5 shows a graph such as FIG. 1 for an example well having what may be described as a "noisy" production rate with respect to time.

In performing analysis methods according to the present disclosure, at selected times a rate of fluid production from a wellbore is measured. The fluid production rate measurements may include measurements of any or all of volumetric and/or mass flow rates of gas, water and oil. Gas production may be quantified volumetrically in units of thousands of standard cubic feet per day (wherein the volume of gas is corrected to the volume it would occupy at "standard' conditions of 25 degrees C. and a pressure of 1 bar), Oil and water production may be quantified volumetrically in barrels per day (1 barrel is equal to 42 U.S. gallons). The fluid production rate measurements may be entered into a computer or computer system for processing as will be explained further with reference to FIGS. 10 and 11.

In analysis methods according to the present disclosure, certain parameters and attributes may be defined. The first nine attributes listed below correspond to a specific production forecast model which may be used in some embodiments. In the present example embodiment the Transient Hyperbolic Model (described below) may be used. Different production forecast models may be used in other embodiments; such other production forecast models may require substitution of or modification of some or all of the below listed attributes for the respective production forecast model's specific parameters.

1. Initial Rate Attribute: This attribute is the initial fluid production rate of the model, written as the parameter $q_i$.

2. Initial Decline Attribute: This attribute is the initial fluid production decline rate used for the production forecast model, expressed herein as the parameter $D_i$.

3. Initial Hyperbolic (b-) Parameter Attribute: This attribute is the initial hyperbolic parameter of the production forecast model, also referred to as the b-parameter, hyperbolic exponent, or n-exponent. It is expressed herein as the parameter $b_i$.

4. Final Hyperbolic Parameter Attribute: This attribute is the final hyperbolic parameter of the production forecast model, expressed herein as the parameter $b_f$.

5. Time to End of Linear Flow Attribute: This attribute is the time to the end of linear flow of the production forecast model, expressed herein as the parameter $t_{elf}$.

6. Distribution of Initial Decline Attribute: This attribute is an estimate of a range of possible values for the Initial Decline Attribute. This attribute constrains randomly generated production forecast models and production forecast model parameters to within boundaries determined, by, for example, expert opinion (i.e., informed, subjective human judgment), allowing for more accurate fluid production forecasts. Any type of distribution may be used. In some embodiments a uniform distribution is used.

7. Distribution of final b-parameter Attribute: This attribute is an estimate of the range of possible values for the b-parameter. This attribute constrains randomly generated models and model parameters to within boundaries determined, by, for example, expert opinion (i.e., informed, subjective human judgment), allowing for more accurate fluid production forecasts. Any type of distribution may be used. In some embodiments a uniform distribution is used.

8. Distribution of time to end of linear flow ($t_{elf}$) Attribute: This attribute is an estimate of a range of possible values for the $t_{elf}$ parameter. This attribute constrains randomly generated models and model parameters to within boundaries determined, by, for example, expert opinion (i.e., informed, subjective human judgment), allowing for more accurate fluid production forecasts. Any type of distribution may be used. In some embodiments a log-normal distribution is used.

9. Prior Likelihood of Model Parameter Attribute: This attribute is the likelihood of any model parameter represented by a probability distribution. This attribute is useful for measuring likelihood of any fluid production model parameter given an expert opinion (i.e., an informed, subjective human judgment) of the fluid production model parameter's distribution. For a uniform probability distribution, the likelihood is normalized by itself and therefore expresses no substantial indication of the likelihood of any parameter value within bounds of the distribution, but only that the fluid production model parameter must fall within the bounds expressed. This is referred to as an uninformative prior. For a parameter in which an informative prior is used as a distribution, such as the time to end of linear flow attribute, this attribute is defined as:

$$\pi(\theta \mid q_i, D_i, b_i, b_f, t_{elf}) = \frac{1}{\sqrt{2\pi}\, t_{elf}\sigma_{t_{elf}}} e^{-\frac{(LN(t_{elf})-\mu_{t_{elf}})^2}{2\sigma_{t_{elf}}^2}} * \ldots \text{etc}$$

Using the likelihood of the time to end of linear flow parameter as an example for the prior likelihood, the prior likelihood may be substituted for any fluid production model parameter, as well as the product of likelihood of multiple fluid production model parameters.

The following attributes are general to the present disclosure and are not related to any specific production forecast model that may be used.

10. Logarithm Residuals Attribute: This attribute evaluates the logarithm residuals between the input data (the fluid production rate measurements with respect to time) and the values of fluid production with respect to time calculated by a specific fluid production forecast model at corresponding values of time. The logarithm residuals may be evaluated for every fluid production rate input data point (i.e., the fluid production rate measurements and time at which the measurements were made), and may be expressed as:

$\varepsilon = \ln(\text{data}) - \ln(\text{model})$

11. Standard Deviation of Logarithm Residuals Attribute: This attribute is a measure of the standard deviation of the above described logarithm residuals, $\varepsilon$. This attribute is useful for measuring a difference in curvature between the input data and the forecast values for any particular fluid production forecast model. This attribute may be expressed as:

$$\sigma_\varepsilon = \sqrt{\frac{1}{n-1}\sum_{i=1}^{n}(\varepsilon_i - \bar{\varepsilon})^2}$$

where n represents the number of input data points being evaluated, and $\varepsilon$ is the logarithm residual. $\bar{\varepsilon}$ represents the average of all values of logarithm residuals.

12. Minimum Standard Deviation of Logarithm Residuals Attribute: This attribute is the minimum standard deviation of logarithm residuals determined during the evaluation of any particular fluid production forecast model. This attribute may be determined by means of a genetic algorithm as each of a plurality of fluid production forecast models is randomly generated from a prior "accepted" (defined below) fluid production forecast model. The attribute may be expressed as:

$\sigma_{\varepsilon_{min}} = \min[\sigma_\varepsilon]$

13. Distribution of Standard Deviation of Logarithm Residuals Attribute: This attribute represents the distribution of the standard deviation of logarithm residuals between the input data and the values calculated by a particular fluid production forecast model. The distribution is assumed to be a normal distribution, with a standard deviation empirically tuned for an optimum rate of acceptance of fluid production forecast models generated, e.g., randomly. This attribute may be expressed as as:

$\theta_\varepsilon \sim \mathcal{N}(\sigma_{\varepsilon_{min}}, 0.01)$

14. Likelihood of Standard Deviation of Logarithm Residuals Attribute: This attribute evaluates the likelihood of the standard deviation of logarithm residuals as a function of the normal distribution with a mean of the minimum standard deviation of logarithm residuals, and standard deviation of 0.01. The attribute may be expressed as:

$$f(\theta_\varepsilon \mid \sigma_\varepsilon) = \frac{1}{\sqrt{2\pi}} e^{-\frac{1}{2}\left(\frac{\sigma_\varepsilon - \sigma_{\varepsilon_{min}}}{0.01}\right)^2}$$

15. Magnitude of Logarithm Residuals Attribute: This attribute evaluates the magnitude of logarithm residuals between the input data and the values calculated by any particular fluid production forecast model. The magnitude of logarithm residuals may be evaluated for every input data point, and are defined as:

$$\in = abs[LN(data) - LN(model)]$$

16. Mean of Magnitude of Logarithm Residuals Attribute: This attribute is a measure of the arithmetic mean of the logarithm residuals, $\in$. This attribute is useful for measuring the absolute error between the input data and the values calculated using an particular fluid production forecast model. The attribute may be expressed as:

$$\mu_\in = \overline{\in}$$

where $\varepsilon$ is the magnitude of the logarithm residual.

17. Minimum Mean of Magnitude of Logarithm Residuals Attribute: This attribute is the minimum mean of logarithm residuals measured during the evaluation of any particular fluid production forecast model. This attribute may be determined by means of a genetic algorithm as each fluid production forecast model is randomly generated from a prior accepted fluid production forecast model. The attribute may be expressed as:

$$\mu_{\in_{min}}[\mu_\in]$$

18. Distribution of Mean of Magnitude of Logarithm Residuals Attribute: This attribute describes the distribution of the mean of magnitude of logarithm residuals between the data and the model fluid production rate forecast. The distribution is assumed to follow a normal distribution, with a standard deviation empirically tuned for an optimum acceptance rate of possible fluid production forecast models, e.g., as generated randomly from a prior accepted fluid production forecast model. The attribute may be expressed as:

$$\theta_\in \sim \mathcal{N}(\mu_{\in_{min}}, 0.1)$$

19. Likelihood of Mean of Magnitude of Logarithm Residuals Attribute: This attribute evaluates the likelihood of the mean of magnitude of logarithm residuals as a function of the normal distribution with a mean of the minimum mean of magnitude of logarithm residuals, and standard deviation of 0.1. The attribute may be expressed as:

$$f(\theta_\epsilon | \mu_\epsilon) = \frac{1}{\sqrt{2\pi}} e^{-\frac{1}{2}\left(\frac{\mu_\epsilon - \mu_{\epsilon_{min}}}{0.1^2}\right)^2}$$

20. Likelihood of Model Proposal Attribute: This attribute evaluates the likelihood that a particular fluid production forecast model is an acceptable description of the fluid production rate measurements (i.e., the input data). The attribute may be expressed as:

$$f(\theta | \sigma_\varepsilon, \mu_\varepsilon) = \frac{1}{2\pi} e^{-\frac{1}{2}\left(\frac{(\sigma_\varepsilon - \sigma_{\varepsilon_{min}})^2}{0.01^2} + \frac{(\mu_\varepsilon - \mu_{\varepsilon_{min}})^2}{0.1^2}\right)} * \pi(\theta | q_i, D_i, b_i, b_f, t_{elf})$$

21. Model Acceptance Attribute: This attribute uses the "Metropolis" algorithm to evaluate the acceptance probability of any particular fluid production forecast model. Each fluid production forecast model is accepted with probability normalized by the likelihood of the prior accepted fluid production forecast model. If the current fluid production forecast model is more likely, it is accepted. Otherwise the fluid production forecast model is accepted with a determinable or determined probability. The attribute may be expressed as:

$$\alpha = \min\left(1, \frac{f(\theta)\pi(\theta)}{f(\theta_{i-1})\pi(\theta_{i-1})}\right)$$

where $\alpha$ is the acceptance probability, $\theta$ is the current model proposal, and $\theta_{i-1}$ is the prior accepted fluid production forecast model.

22. Distribution of Accepted Model Proposals Attribute: This attribute is the result of the evaluation and acceptance of fluid production forecast models from the fluid production forecast model acceptance attribute. This attribute is the set of possible forecasts, referred to as the statistical distribution of well performance.

Figure 6:
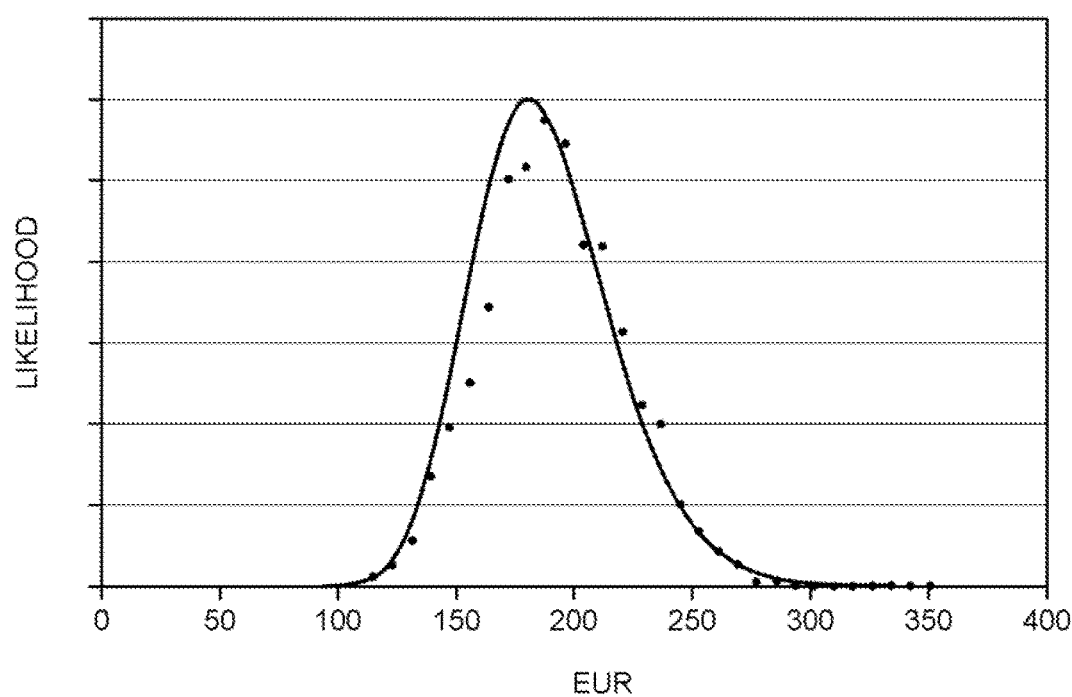
FIG. 6 shows a histogram of distribution of accepted model proposals ranked by estimated ultimate recovery (EUR).

23. Histogram of Distribution of Accepted Model Proposals Attribute: A histogram or "density function" of the distribution of accepted fluid production forecast models, after ranking by expected ultimate recovery (EUR). This attribute is useful for illustrating the likelihood of the EUR from the accepted fluid production forecast models, and can be observed in FIG. 6.

Figure 7:
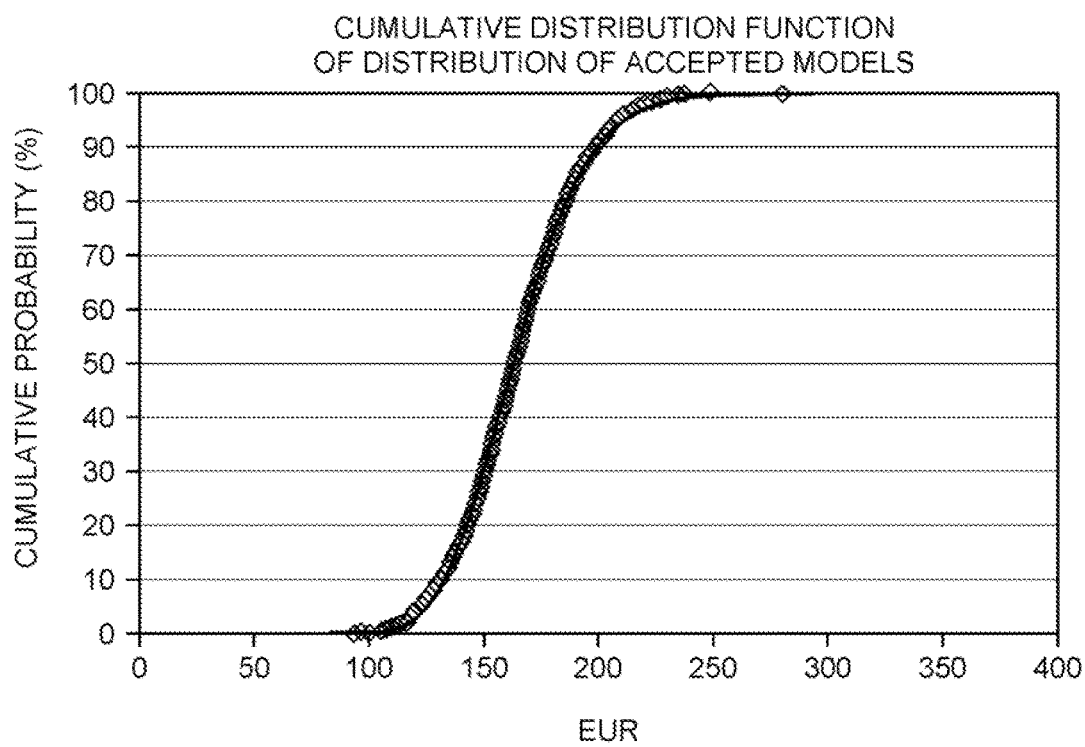
FIG. 7 shows a cumulative distribution function of accepted model proposals ranked by EUR.

24. Cumulative Distribution Function of Accepted Model Proposals Attribute: The cumulative distribution function of the distribution of accepted fluid production forecast models, after ranking by EUR. This attribute is useful for illustrating the percentiles of the distribution of accepted fluid production forecast models, and can be seen in FIG. 7.

Figure 8:
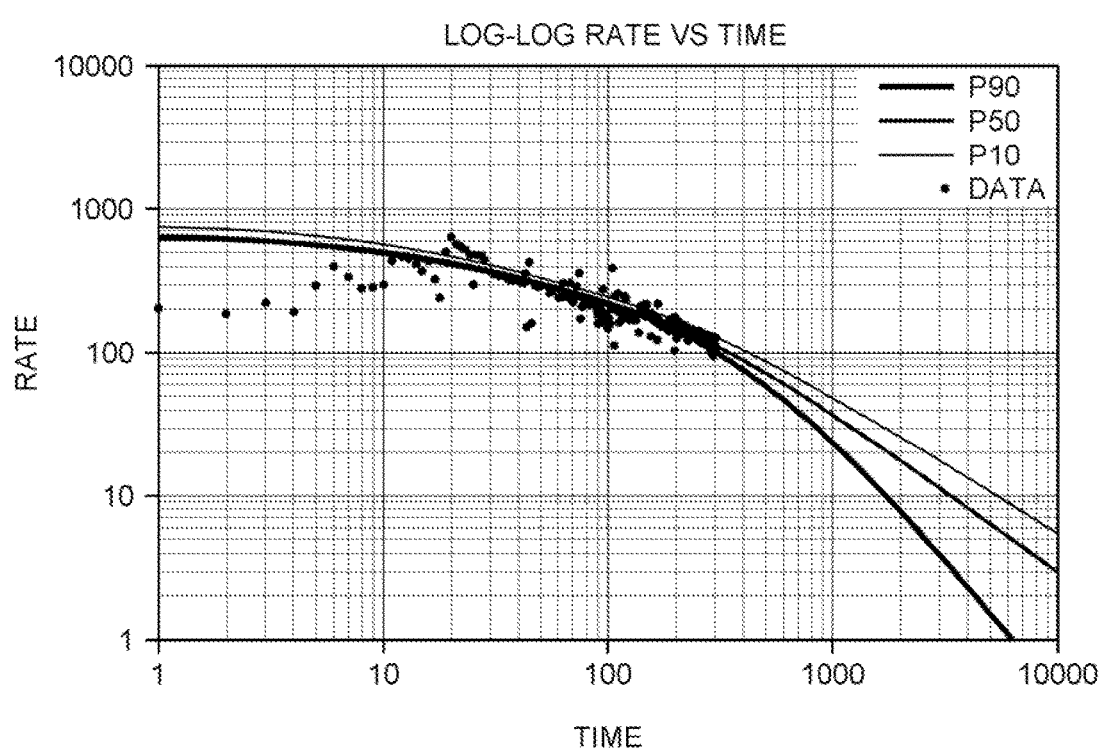
FIG. 8 shows P90, P50, & P10 percentile neighborhood production forecasts.
Figure 9:
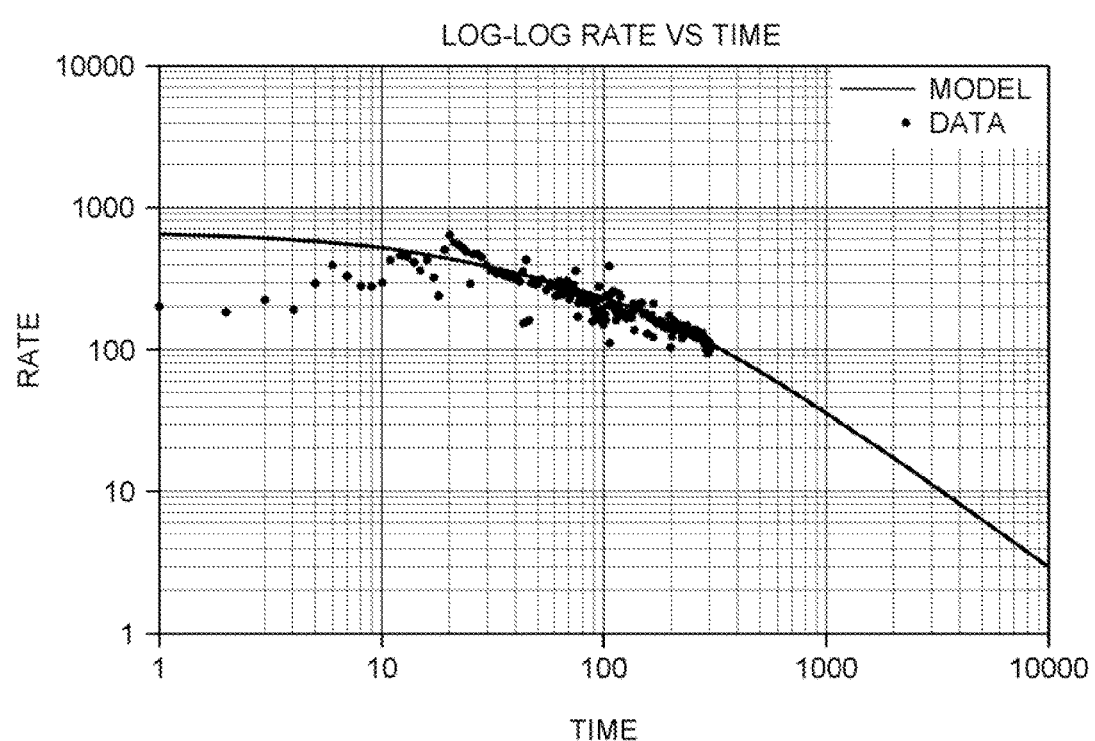
FIG. 9 shows mean percentile neighborhood production forecast.

25. Production Forecast of Percentile Neighborhood Attribute: The forecast of a given percentile neighborhood represents features from a plurality accepted fluid production forecast model, as well as the possible accepted fluid production forecast models that are not generated due to limiting the number of iterations in the simulation for the purpose of reducing calculation time. At each percentile of interest, a production forecast representative of the features of a plurality of forecasts proximate the given percentile (hence "percentile neighborhood") is created by averaging each parameter of the fluid production forecast model among all iterations in the neighborhood. A neighborhood size of +/−1 percentile is typically chosen. The $10^{th}$, $50^{th}$, and $90^{th}$ percentiles, referred to as P90, P50, and P10, respectively, are typically chosen for a simplified representation of the full distribution of production forecasts, although any percentile may be chosen. Examples of P90, P50, and P10 forecasts are shown in FIG. 8. The mean forecast is determined as the percentile neighborhood's forecast which results in the mean EUR. An example of a mean forecast is shown in FIG. 9.

Methods according to the present disclosure may use, without limitation, any of the following methods that may be advantageously applied for statistical prediction of fluid production rates, including but not limited to the attributes described above:

26. Markov Chain Monte Carlo Method: This method utilizes a Markov chain to generate random model proposals for evaluation of likelihood of acceptance for the set of possible fluid production rate forecasts.

27. Production Forecast Method: This method uses a production forecast to calculate an expected time-dependent array of fluid production rates. The results of any forecast are referred to as the "fluid production forecast model". While any production forecast model may be used, in the present example implementation, the Transient Hyperbolic Model is used.

28. Expected Ultimate Recovery Integral Method: This method evaluates the integral of the rate-time array of fluid production rates from a fluid production forecast model to forecast the EUR for such fluid production forecast model.

29. Rank of Accepted Model Proposals Method: This method ranks the set of fluid production forecast models by the EUR to evaluate the chance that the EUR of the fluid production forecast models exceed a value of interest. This method is useful for reporting the confidence interval of EUR for the production data that has been analyzed.

Figure 10A:
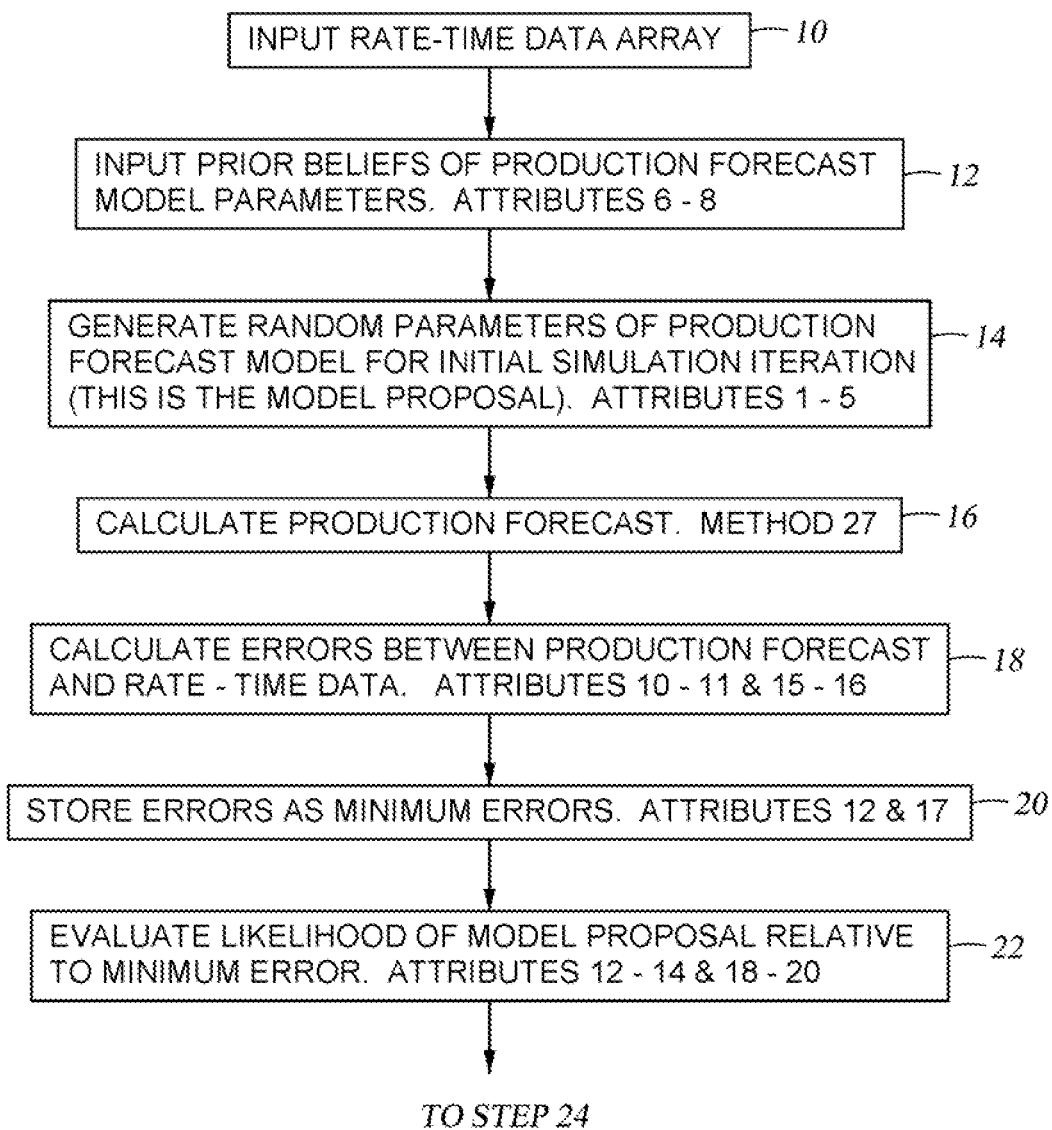
FIGS. 10A, 10B and 10C show a flow chart of an example method according to the present disclosure.
Figure 10B:
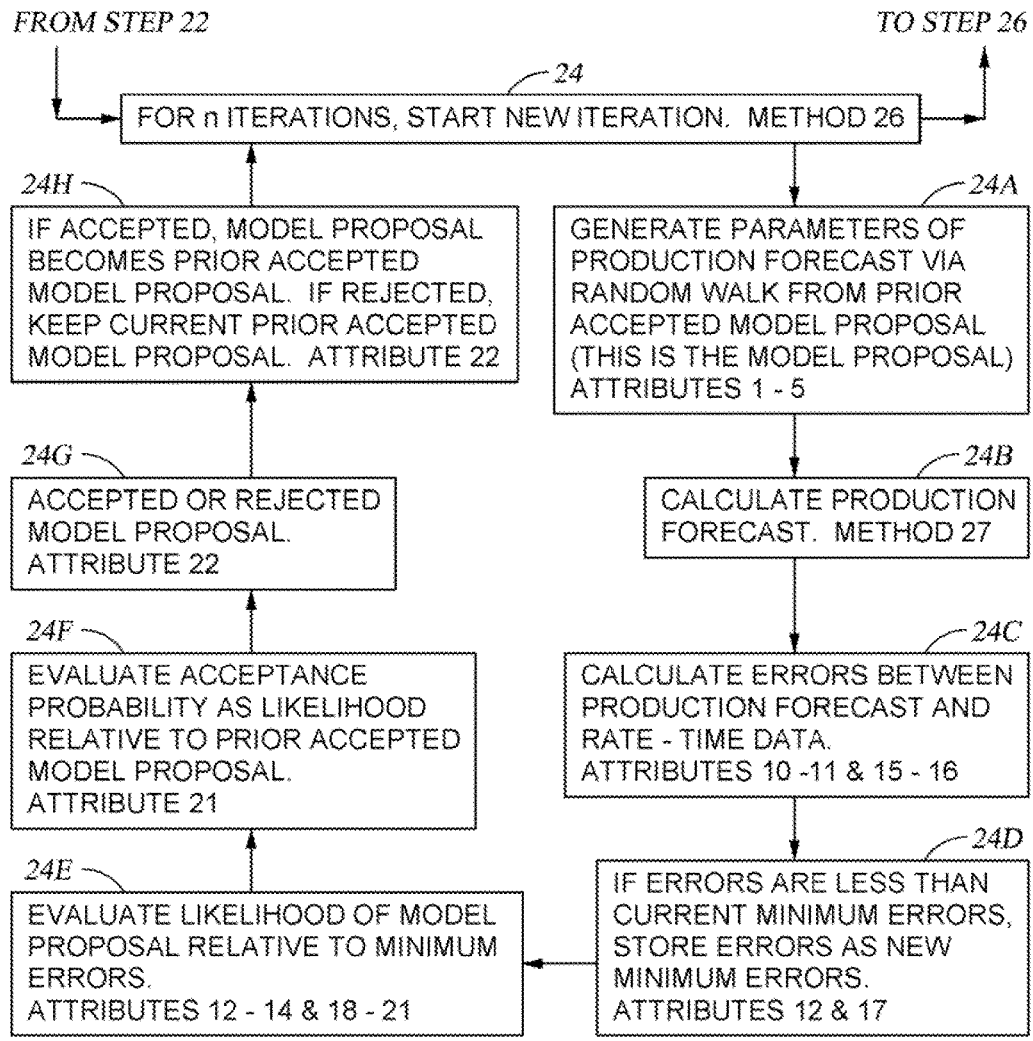
Figure 10C:
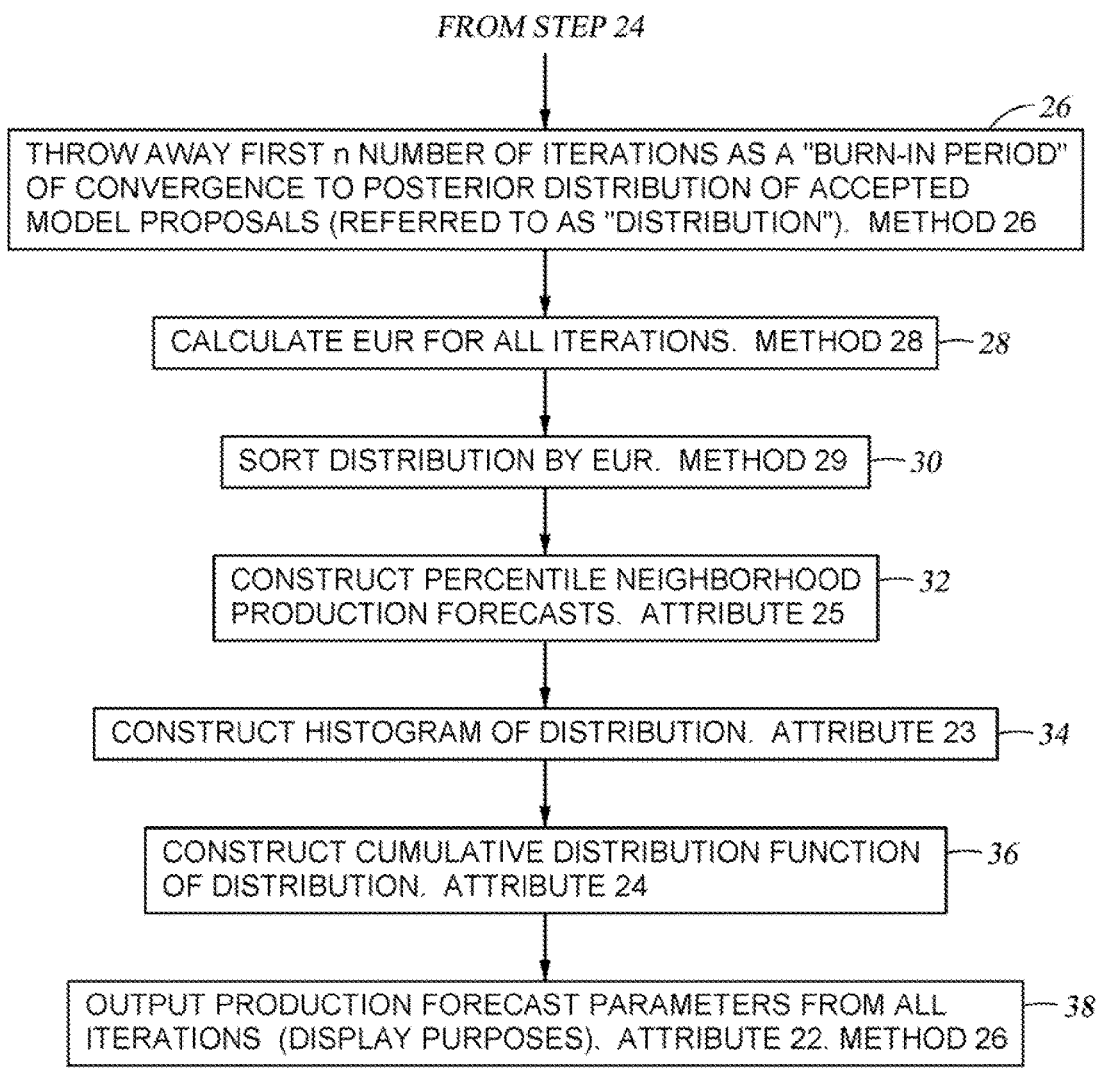

Referring to FIGS. 10A, 10B and 10C, an example well fluid production rate analysis method according to the present disclosure will now be explained. In FIG. 10 A, at 10, fluid production rate measurements with respect to time (i.e., the elapsed time since initiation of fluid production from a wellbore) may be input to a computer or computer system (FIG. 11) programmed to perform a method as described herein. At 12, prior beliefs (e.g., subjective human interpretations) of fluid production forecast model parameters are input to the computer or computer system. The prior beliefs may be represented by attributes 6 through 8 listed above. At 14, random values of parameters for a fluid production rate forecast model for an initial simulation iteration (this is the initial fluid production forecast model and may be represented by parameters 1-5 above) are entered into the computer or computer system.

At 16, a fluid production rate forecast is generated by the computer or computer system. The fluid production rate forecast may be attribute 27 described above in the present implementation. At 18, differences (errors) between the fluid production rate forecast and the input data fluid production rate measurements (at the time(s) of the measurements) are calculated. The errors may be expressed by attributes 10, 11, 15 and 16 described above At 20, the errors may be stored in the computer or computer system as minimum errors, for example as attributes 12 and 17 set forth above. At 22, the likelihood of a fluid production rate forecast model relative to minimum errors may be determined by the computer or computer system. This may be performed by the computer or computer system using attributes 12-14 and 18-20 as set forth above.

In FIG. 10B, at 24, an iterative process, using, for example, the Markov Chain Monte Carlo method (attribute 26 as set forth above) may be initiated. At 24A, parameters of a fluid production rate forecast generated using a random walk from a prior accepted fluid production rate forecast model are generated by the computer or computer system. At 24B, a fluid production rate forecast may be generated, e.g., using model attribute 27 as set forth above. At 24C, errors between the fluid production rate forecast and the input data are calculated by the computer or computer system as attributes 10, 11, 15 and 16 set forth above. At 24D, if the current iteration errors are smaller than the previous iteration errors, the current iteration errors are stored in the computer or computer system. At 24E, a likelihood of the fluid production rate forecast model relative to minimum error is calculated by the computer or computer system.

At 24F, acceptance probability as likelihood relative to the prior accepted fluid production rate forecast model is calculated in the computer or computer system This may be performed using attribute 21 set forth above. At 24G, the fluid production rate forecast model is accepted or rejected, which may be based on attribute 22 as set forth above. At 24J, if the fluid production rate forecast model is accepted, it becomes the "prior" accepted fluid production rate forecast mode in a subsequent iteration. If the fluid production rate forecast model is rejected, then the most recent accepted fluid production rate forecast model is retained as the "prior" accepted model proposal, e.g., as evaluated using attribute 22 given above.

In FIG. 10C, at 26, a selected number, n, of fluid production rate forecast models may be discarded during an initialization period in which convergence to a selected number of fluid production rate forecast models is obtained, which may be referred to as the "posterior distribution." At 28, an EUR may be calculated for all iterations of all accepted fluid production rate forecast models. At 30, a fluid production rate forecast model distribution may be sorted by EUR. At 32, the percentiles of the fluid production rate forecasts may be generated in the computer or computer system using attribute 25 set forth above. At 34 and 36, respectively, a histogram and cumulative distribution plot sorted by EUR of the selected fluid production rate forecast models may be generated by the computer or computer system. At 38, fluid production rate forecasts from all iterations may be displayed, e.g. on a graphic computer user interface.

Figure 11:
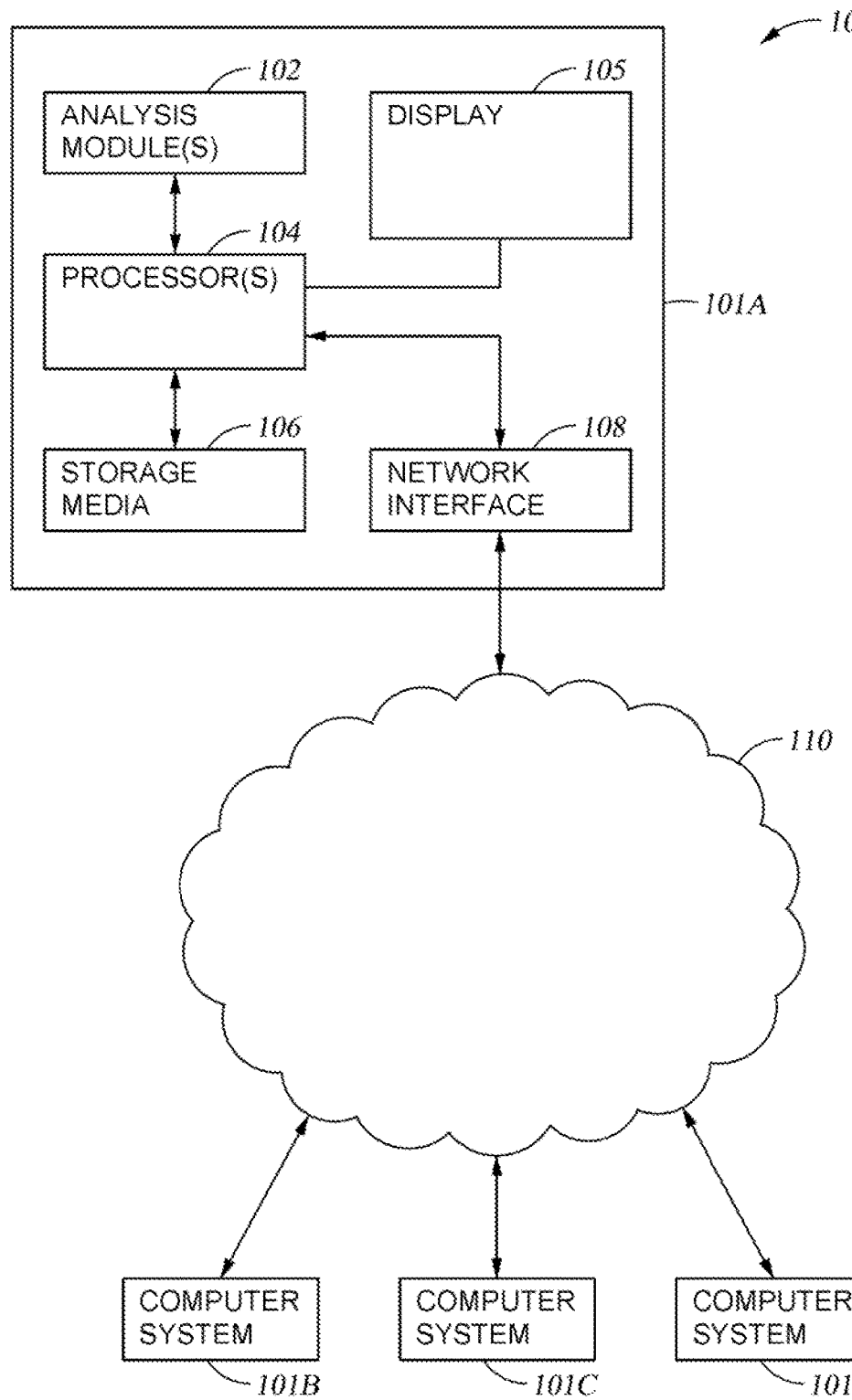
FIG. 11 shows an example computer system for performing analysis according to the present disclosure.

FIG. 11 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIG. 10. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 11, and/or the computing system 100 may have a different configuration or arrangement of the components shown in FIG. 11. The various components shown in FIG. 11 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing a well production forecast, comprising:
    a) inputting fluid production rate measurements made at selected times into a computer;
    b) inputting probability distributions related to a likelihood of each of a plurality of fluid production rate forecast model parameters into the computer;
    c) in the computer generating an initial forecast of fluid production rates and total produced fluid volumes using a selected fluid production forecast model, the selected model using randomly selected values of initial production rate, initial decline rate, initial hyperbolic parameter, final hyperbolic parameter and time to end of linear flow generated from the input probability distributions;
    d) at a time after a last one of the selected times, in the computer comparing the initial forecast with the fluid production rate measurements and total produced fluid volume measurements to generate an error measurement and a likelihood of the selected forecast model relative to a minimum error, the error measurement stored as the minimum error;
    e) in the computer, adjusting parameters of the selected initial production forecast model by random walk and calculating, A) an adjusted forecast of fluid production rates, B) adjusted total produced fluid volumes and C) an adjusted error measurement;
    f) A) if the adjusted error measurement is less than the minimum error, setting the random walk adjusted parameters as parameters for the selected initial production forecast model and setting the adjusted error measurement as the minimum error, and B) retaining parameters of the selected initial production forecast model prior to random walk adjusting and corresponding error measurement if the adjusted error measurement is not less than the error measurement prior to random walk adjusting;
    g) accepting or rejecting the selected production forecast model based upon a likelihood of the error measurement relative to the likelihood of the error measurement for a prior forecast model;
    h) in the computer, repeating e), f), and g) for a predetermined number of iterations to generate a plurality of fluid production rate forecast models each having a determined likelihood of error;
    i) discarding a selected number of the plurality of fluid production rate forecast models;
    j) sorting and displaying the plurality of fluid production rate forecast models as a number of fluid production rate forecast models with respect to total produced fluid volumes for each fluid production rate forecast model;
    k) averaging the accepted set of model parameters to generate an aggregate fluid production forecast model that represents the models within a chosen percentile size of a specific percentile of the fluid production rate forecast models displayed with respect to total produced fluid volumes; and
    l) repeating k) for selected percentiles.

2. The method of claim 1 wherein the selected production forecast model is based on a Markov Chain Monte Carlo Method.

3. The method of claim 1 wherein the plurality of fluid production rate forecast model parameters are constrained by one or more of (i) an estimate of a range of possible values of the initial fluid production decline rate, (ii) a distribution of the final hyperbolic parameter, (iii) a distribution of the time to the end of linear flow, and (iv) a likelihood of any model parameter being represented by a probability distribution.

* * * * *